(12) United States Patent
Calvo et al.

(10) Patent No.: US 10,995,610 B2
(45) Date of Patent: May 4, 2021

(54) NANOTRACER FOR OIL RECOVERY AND METHOD OF PREPARATION THEREOF

(71) Applicants: YPF TECNOLOGÍA S.A., Ciudad Autónoma de Buenos Aires (AR); CONSEJO NACIONAL DE INVESTIGACIONES CIENTÍFICAS Y TÉCNICAS (CONICET), Ciudad Autónoma de Buenos Aires (AR)

(72) Inventors: Alejandra Calvo, La Plata (AR); María Laura Vera, Ranelagh (AR); María Laura Dell'Archiprete, La Plata (AR); Melina Vanesa Cozzarin, La Plata (AR); Juan Martín Giussi, La Plata (AR); Mónica Gonzalez, La Plata (AR); Félix Gregorio Requejo, La Plata (AR); Omar Azzaroni, La Plata (AR)

(73) Assignees: YPF Technologia S.A., Ciudad Autonoma de Buenos Aires (AR); Consejo Nacional De Investigaciones Científicas Y Técnicas (Conicet), Ciudad Autonoma de Buenos Aires (AR)

( * ) Notice: Subject to any disclaimer, the term of this patent is extended or adjusted under 35 U.S.C. 154(b) by 213 days.

(21) Appl. No.: 16/396,306

(22) Filed: Apr. 26, 2019

(65) Prior Publication Data
US 2019/0330976 A1 Oct. 31, 2019

Related U.S. Application Data

(60) Provisional application No. 62/663,728, filed on Apr. 27, 2018.

(51) Int. Cl.
*E21B 47/11* (2012.01)
*C09K 11/02* (2006.01)
(Continued)

(52) U.S. Cl.
CPC ............ *E21B 47/11* (2020.05); *C01B 33/149* (2013.01); *C08F 4/7006* (2013.01); *C08F 20/38* (2013.01);
(Continued)

(58) Field of Classification Search
None
See application file for complete search history.

(56) References Cited

U.S. PATENT DOCUMENTS

2011/0277996 A1* 11/2011 Cullick ................. E21B 33/138
166/250.12
2016/0075941 A1* 3/2016 Duenckel ............... C09K 8/665
166/280.2

(Continued)

FOREIGN PATENT DOCUMENTS

CN 102731457 A 10/2012
WO WO2007/102023 A1 9/2007

*Primary Examiner* — John J Figueroa
(74) *Attorney, Agent, or Firm* — Muncy, Geissler, Olds & Lowe, P.C.

(57) ABSTRACT

Tracers for oil recovery, particularly fluorescent nanotracers conservative in aqueous phases. The tracer comprises a core-shell nanoparticle tailored according to the operation to be traced. It contains a fluorescent core that allows the detection thereof in the field and a functionalized polymeric shell that provides increased stability in high salinity aqueous phases. A method for preparing said nanotracer. Given the nanotracer versatility, it can be used both for tracing fracking steps as well as meshes of secondary and tertiary recovery.

10 Claims, 8 Drawing Sheets

(51) Int. Cl.
    *C09K 11/59*     (2006.01)
    *C01B 33/149*     (2006.01)
    *C08F 20/38*     (2006.01)
    *C08K 5/09*     (2006.01)
    *C08F 4/70*     (2006.01)
    *B82Y 40/00*     (2011.01)
    *C09K 8/588*     (2006.01)

(52) U.S. Cl.
    CPC ............... *C08K 5/09* (2013.01); *C09K 8/588* (2013.01); *C09K 11/025* (2013.01); *C09K 11/59* (2013.01); *B82Y 40/00* (2013.01); *C01P 2004/03* (2013.01); *C01P 2004/04* (2013.01); *C01P 2004/32* (2013.01); *C01P 2004/64* (2013.01); *C08F 2438/01* (2013.01); *C08F 2500/24* (2013.01)

(56) References Cited

U.S. PATENT DOCUMENTS

2018/0298277 A1* 10/2018 Borrell .................... E21B 47/11
2018/0306027 A1* 10/2018 Sherman ................ E21B 47/11

\* cited by examiner

NANOTRACER FOR OIL RECOVERY AND METHOD OF PREPARATION THEREOF

FIELD OF THE INVENTION

The present invention relates to tracers used in the oil industry, particularly fluorescent nanotracers for oil recovery.

BACKGROUND OF THE INVENTION

Tracers are used in the oil industry, e.g. during fracking and recovery processes. Said tracers, frequently employed as particulates, allow either determining traceability and studying conductivity or connections between injection/production wells, or showing from which fracking stage a product under analysis comes.

During oil recovery processes and particularly in wells with marginal production, such as non-conventional wells, presence of an aqueous phase with high salinity may affect the colloidal stability of tracers and jeopardize their performance.

International patent application WO 2007/102023 discloses tracers for the oil industry comprising metals which form fluorescent complexes, in the form of finely divided particles.

Patent application CN 102731457 discloses an allyl-7-diethylamino-4-methylcoumarin-ammonium bromide monomer and a fluorescent polymer for use as a tracer in wells.

Said patent documents neither disclose nanoparticles with a core-shell structure, nor their use in wells with high salinity aqueous phases.

The prior art generally relates to tracers comprising radioactive elements or toxic compounds, such as fluorobenzoic acids. Additionally, tracers of the prior art are not completely adapted for use in wells showing a high salinity aqueous phase.

Therefore, there is still a need of providing a tracer with nanometer dimensions with stability properties suitable for wells with high salinity aqueous phases, as well as improved properties of rock retention and partitioning in an organic phase.

BRIEF DESCRIPTION OF THE INVENTION

The advantageous characteristics and effects of the present invention are obtained by means of a superficial chemical functionalization of nanotracers (NT). Said functionalization involves growth of a zwitterionic polymer on the NT surface from amino groups ($-NH_2$) present therein.

By means of said functionalization, colloidal stability of nanotracers in highly saline media is obtained, allowing overcoming the aforementioned drawbacks of the prior art.

In a first aspect, an object of the invention is providing a nanotracer for oil recovering, said nanotracer comprising:
 a core containing a fluorescent cell, and
 a shell surrounding the core,
wherein the external surface of the shell comprises a zwitterionic polymer.

In a preferred embodiment of the nanotracer of the present invention, the fluorescent cell comprises silica and a fluorophore.

In another preferred embodiment of the nanotracer of the present invention, the shell comprises a silica polymer with amino groups.

In yet another preferred embodiment of the nanotracer of the present invention, the zwitterionic polymer comprises a polymer of [2-(methacryloyloxy) ethyl] dimethyl (3-sulfopropyl) ammonium hydroxide.

In a preferred embodiment, the nanotracer of the present invention is in the shape of a substantially spherical particle having a diameter of about 80 nm, wherein the core has an average size of about 180 nm.

In a second aspect, another object of the invention is a method of preparation of a nanotracer for oil recovery, the method comprising the steps of:
 providing a particle comprising a core containing a fluorescent cell and a shell surrounding the core,
 reacting the shell surface with a polymerization initiator so as to obtain a particle with anchoring sites, and
 reacting the particle with anchoring sites with a monomer in anhydrous conditions and in the presence of a catalyst and a ligand so as to produce the monomer polymerization.

In a preferred embodiment of the method of the present invention, the shell has a molecular structure comprising amino groups.

In another preferred embodiment of the method of the present invention, the polymerization initiator is bromoisobutyrate.

In yet another preferred embodiment of the method of the present invention, the monomer is [2-(methacryloyloxy) ethyl] dimethyl (3-sulfopropyl) ammonium hydroxide (MESDAH).

In a preferred embodiment of the method of the present invention, the catalyst comprises copper and the ligand is bipyridine.

In a preferred embodiment of the method of the present invention, the step of reacting the shell surface with a polymerization initiator comprises adding anhydrous tetrahydrofuran (THF) to a dry NT powder, sonicating during 10 min and passing to an ice bath over platen. Preferably, this step is carried out under stirring at 800 rpm. Preferably, the dry NT powder mass is of about 0.01 g to 1 g, preferably about 0.1 g.

In a further preferred embodiment of the method of the present invention, the step of reacting the shell surface with a polymerization initiator further comprises adding 640 µL of triethylamine and 0.5 mL of bromoisobutyrate. Preferably, this step is carried out under nitrogen bubbling for 24 h, under stirring at 800 rpm at a temperature of 26° C. Even more preferably, a washing step is subsequently carried out.

In a preferred embodiment of the method of the present invention, the step of reacting the particle with anchoring sites with a monomer in anhydrous conditions and in the presence of a catalyst and a ligand comprises adding a NT solution to a Schlenk tube under nitrogen bubbling and stirring for 40 min at 600 rpm at a temperature of 25° C. Preferably, this step comprises adding 1.3894 g of MEDSAH dissolved in 10 mL of MeOH:$H_2O$ (4:1) and stirring for 40 min.

In another preferred embodiment of the method of the present invention, the step of reacting the particle with anchoring sites with a monomer in anhydrous conditions and in the presence of a catalyst and a ligand comprises adding bipyridine under nitrogen bubbling and stirring at 800 rpm for 45 min. Preferably, the catalyst is added under stirring at 800 rpm at a temperature of 26° C. Even more preferably, a washing step is subsequently carried out.

The nanotracers of the present invention have the following advantageous characteristics, with respect to the nanotracers of the prior art.

They do not contain radioactive elements or fluorobenzoic acids, unlike currently available nanotracers.

They are fluorescent core-shell particles with nanometer dimensions, based on silicon and polymers, having enhanced properties as compared to the nanotracers of the prior art.

They are easily detected in the field by means of portable equipment such as a fluorescence spectrophotometer.

Due to the characteristics of their functionalized polymeric shell,
they are stable in high salinity conditions,
they are not retained in a rock or rock formation, and
they do not show partition in oil phases, only flowing in the aqueous phase.

The preparation method thereof is versatile and allows obtaining "tailored" tracers as necessary. A number of tracers with different properties may be obtained with slight modifications in the core or the shell.

DETAILED DESCRIPTION OF THE INVENTION

The present invention will be described in detail hereinafter, with reference to the figures and examples.

The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

As used herein, the term "about" means approximately, in the region of, roughly, or around. When the term "about" is used in conjunction with a numerical value or range, it modifies that value or range by extending the boundaries above and below the numerical value(s) set forth. In general, the term "about" is used herein to modify a numerical value(s) above and below the stated value(s) within a confidence interval of 90% or 95%.

As used herein, the term "fluorophore" is meant to include a moiety of a larger molecule or conjugate that can be induced to emit fluorescence when irradiated, i.e., excited, by electromagnetic radiation of an appropriate wavelength.

As used herein, the term "zwitterionic polymer" refers to a polymer with a molecular structure having functional groups with permanent negative charges and groups with permanent positive charges.

Figure 1:
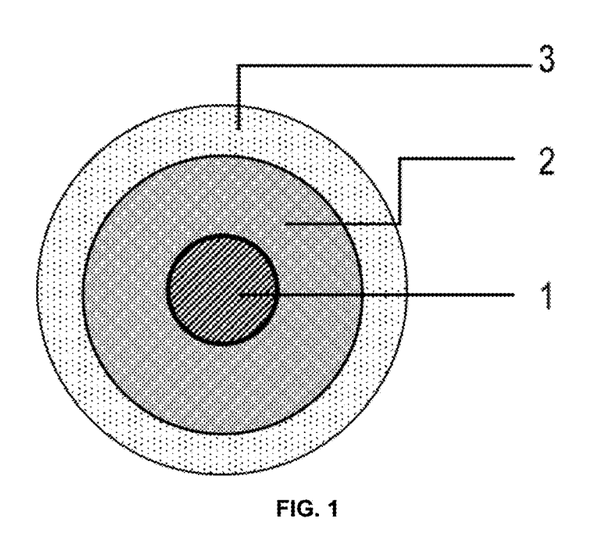
FIG. 1 shows a general diagram of the core-shell structure of the nanotracers of the present invention.

In an embodiment of the present invention shown in FIG. 1, the nanotracers have a core-shell structure comprising:
a core, with the function of containing a fluorescent probe comprising silicon and a colorant, typically fluorescent particles containing a fluorophore,
a polymeric shell, with the function of i) protecting the colorant against the aqueous matrix, and ii) modifying the particle size,
a "functionalization shell" on the outer surface of the polymeric shell, with the function of i) protecting the colorant against the aqueous matrix; and ii) generating an interaction with or affinity for the crude oil.

The average particle size of the core is about 100 nm, preferably 80 nm. The average particle size of the nanotracers of the present invention is about 150 nm, the particles having a substantially spherical shape.

Said shape and said reduced size allow the nanotracer particle to not being retained within the formation pore throats.

The core comprises typically silica ($SiO_2$) and a colorant or fluorophore, preferably in the shape of fluorescent particles, surrounded by aminopropyl groups. Said core is typically obtained by sol-gel techniques. The fluorescent particles are detectable at reduced concentrations and their fluorescent property is unalterable in the medium to be traced, generally composed of crude oil and formation water. Said particles are stable during several months in the well conditions, such as salinity and temperature. Fluorescence color is selectable and allows detection in the field.

The polymeric shell is typically obtained from $SiO_2$, using sol-gel techniques. The fluorophore may comprise fluorescein isothiocyanate (FITC) and/or other fluorescein derivatives.

"Functionalization" of the shell outer surface consists of covalent anchoring of molecules, as it will be described herein. In the present invention, functionalization involves zwitterionic polymers.

Unexpectedly, the presence of a zwitterionic polymer on the surface stabilizes the particles in the formation water with high salinity, as can be observed in the following exemplary embodiments.

Figure 2:
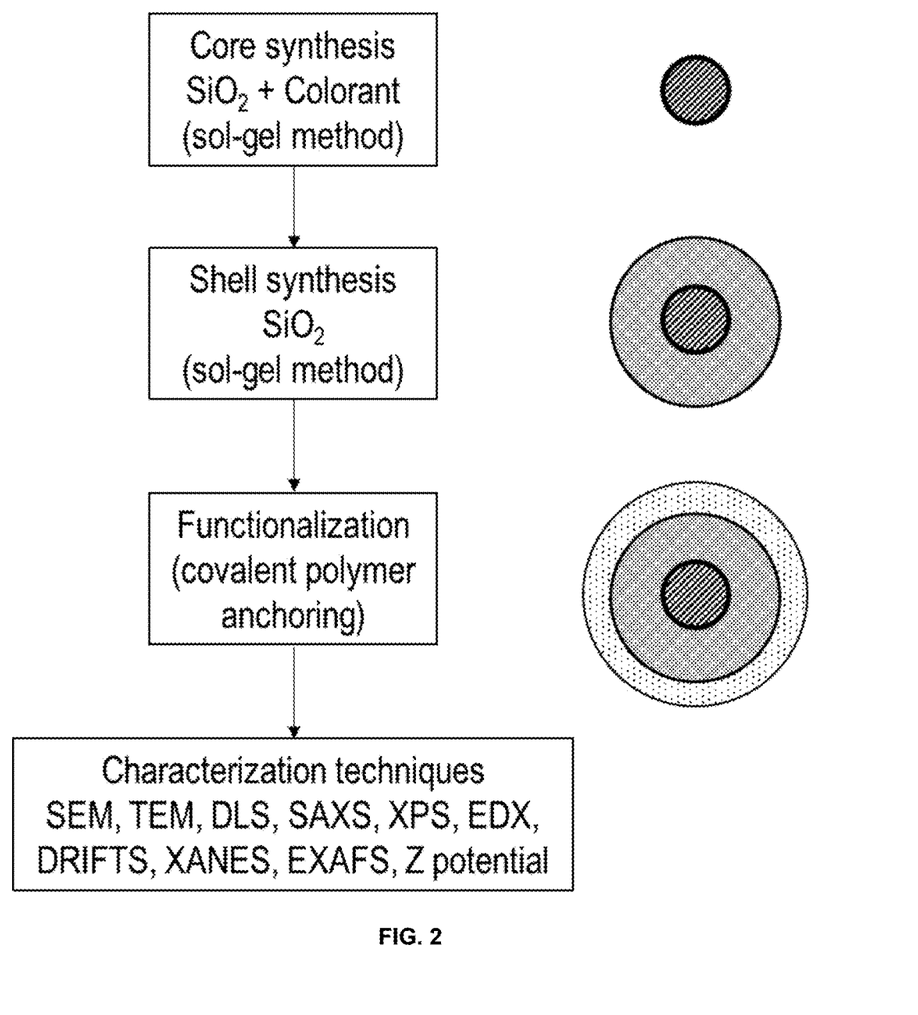
FIG. 2 shows a general diagram of the method for preparing nanotracers of the present invention.

FIG. 2 shows a diagram of the preparation method of the present invention that is illustrated in the following exemplary embodiments.

The characteristics of the formation water and crude oil composition of each well allows determining the nanotracer core and shell designs.

EXAMPLES a) Synthesis and Characterization of Nanotracers

The nanotracers (NT) of the present invention are synthesized from a precursor, as will be described below.

The nanotracer precursors (NTP) have the NT characteristics, excepting the "functionalized shell", i.e. they comprise a core and a shell surrounding the same. The molecular structure of said shell has amino (—NH$_2$) functional groups.

Functionalization of NPT involves the growth of a zwitterionic polymer from the NTP surface, from the amino groups.

The method of Atom Transfer Radical Polymerization (ATRP) was used to perform the polymer growth from the NTP surface.

In the present exemplary embodiment, bromoisobutyrate was used as polymerization initiator, covalently linked to NTPs by the surface amino groups already present in the shell molecular structure. The sites where the initiator covalently links to NTPs form "anchoring sites" for polymer growth.

The monomer used for the polymer growth is [2-(methacryloyloxy) ethyl] dimethyl (3-sulfopropyl) ammonium hydroxide (MEDSAH), a zwitterionic monomer having a sulfonate group and a quaternary amine providing a permanent negative charge and a permanent positive charge, respectively. Cu(I)/Cu(II) were used as catalyst and bipyridine was used as ligand.

Figure 3:
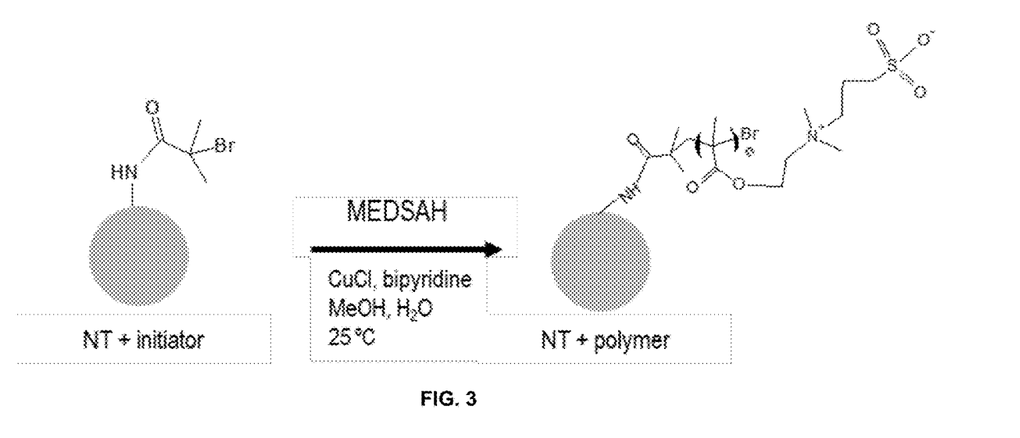
FIG. 3 shows a polymerization diagram starting from an anchoring site in an exemplary embodiment of the method of the present invention.

The chemical structure of MEDSAH is:

FIG. 3 shows a NTP polymerization diagram, starting from a single anchoring site, by way of example.

The synthesis process consists of the steps of NTP functionalization with initiator and polymer growth.

Generally, in order to covalently link the initiator to a SiO$_2$ substrate, either as a film or as a nanoparticle, a prior post-grafting step of the oxide with some alcoxide so as to incorporate an amino group, has to be performed. In the present method, since NTP already have surface amino groups, this prior step is not necessary, and the step of linkage to the initiator can be directly performed.

i) NTP Surface Functionalization with the Polymerization Initiator

Since the polymerization reaction requires anhydrous conditions, all glass material used therein is previously dried in an oven and the solvent used in this synthesis step, i.e. tetrahydrofuran (THF) is dried under reflux in the presence of Na until the water concentration is less than 5 ppm. This is evidenced by the presence of benzophenone in the reaction medium, showing an intense blue color when reaching the desired water concentration.

In order to perform NTP functionalization with bromoisobutyrate, a required mass amount of particles is placed into a tube along with a given volume of THF. Sonication is carried out for 10 min so as to homogenize the system and it is taken to a platen with magnetic stirring at 800 rpm. Then triethylamine is added in order to avoid formation of HBr and the reaction tube is placed in an ice/water bath while stirring. N$_2$ is bubbled for a few minutes so as to create an atmosphere free from humidity inside the tube and then the initiator is added, the ice bath is removed and replaced with a water bath at 26° C. The reaction goes on for 24 h under stirring and temperature conditions as mentioned. Finally, in order to wash the NT, most of the THF is evaporated in a rotavapor and then cycles of centrifugation, re-dispersion and sonication with Milli-Q water, EtOH are repeated and two cycles with MeOH:H$_2$O Milli Q (4:1). The functionalized NTP are kept refrigerated in solution.

ii) Polymer Growth on the NTP Surface

In order to optimize the synthesis process and obtain a stable product in highly saline media, three synthesis protocols (A, B and C) were performed, studying variables like reaction time and presence of a moderator of catalytic activity. The general process, employed in the three cases, is detailed below.

A given volume of functionalized NTP with initiator is placed into a Schlenk tube, which is connected to a N$_2$ line and bubbled for 40 min. Additionally, the temperature is controlled at 26° C. as well as stirring at 800 rpm. A monomer solution is prepared in another Schlenk tube, MEDSAH is dissolved in MeOH:H$_2$O (4:1) and N$_2$ is also bubbled for 40 min.

Bipyridine is added to the tube with the NTs, and passage of N$_2$ is further continued for 45 min. Then, the metal (Cu(I) and/or Cu(II)) that will form the catalyst complex with bipyridine is added. Finally, the monomer solution is added. The reaction is carried out for the time established in the protocol and then the synthesis product is washed by means of centrifugation, re-dispersion and sonication cycles in acidified water and Milli-Q water.

After the washing process, the obtained NTs are dispersed in THF and dried in oven for 24 h. They are stored for characterization.

Figure 4:
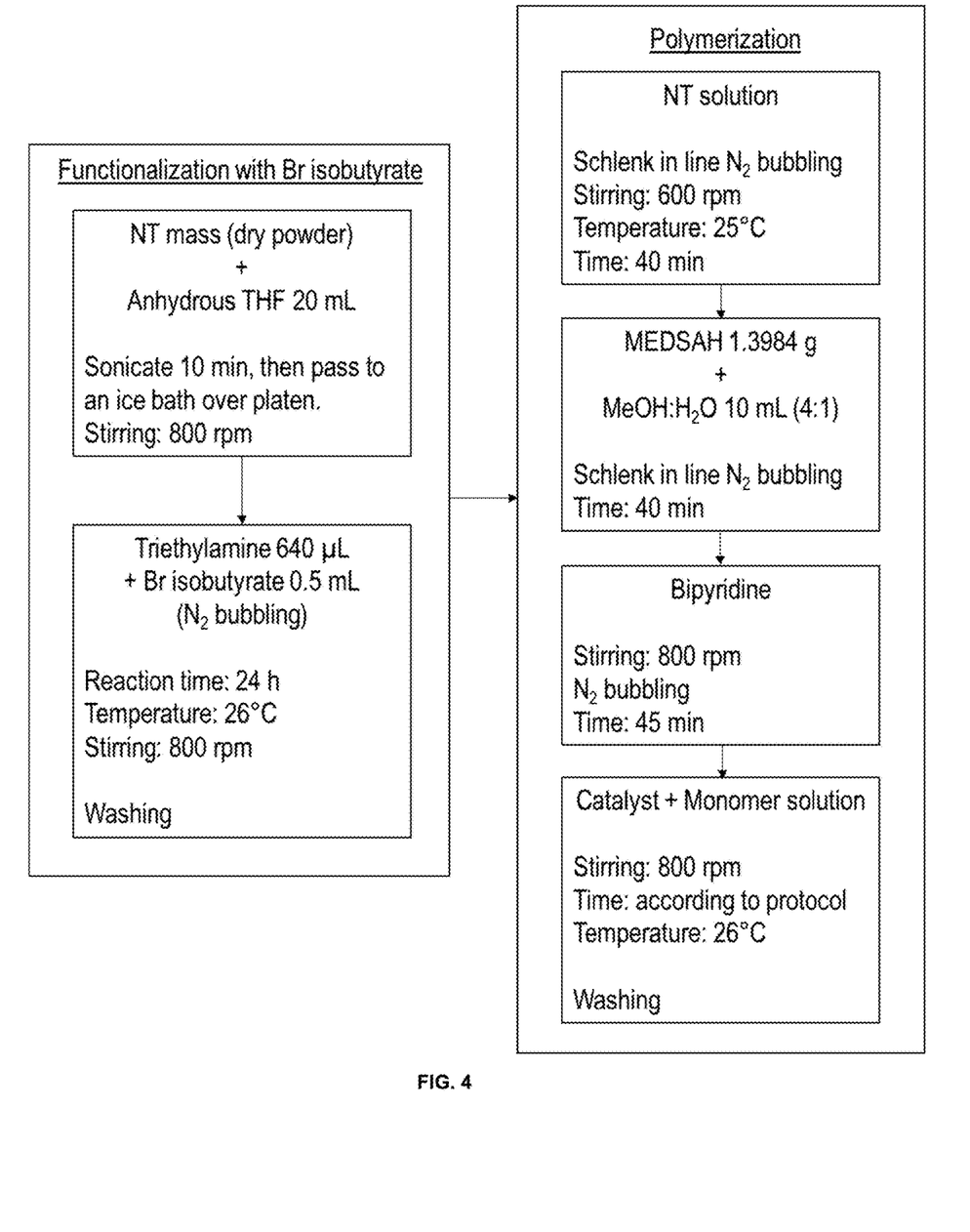
FIG. 4 shows a block diagram of an exemplary embodiment of the method of the present invention comprising functionalization steps with bromoisobutyrate and polymerization steps.

FIG. 4 shows a diagram of the experimental synthesis steps. Table 1 shows the molar ratios employed of each reactant and the polymerization time for each analyzed synthesis protocol. All syntheses were carried out in a final volume of 20 mL of MeOH:H$_2$O (4:1), employing 0.1 g of functionalized NT.

TABLE 1

Analyzed molar ratios of reactants and polymerization time

| Protocol | MEDSAH | bipyridine | Cu (I) | Cu (II) | Time (min) |
|----------|--------|------------|--------|---------|------------|
| A | 5 | 1 | 0.5 | 0.3 | 15 |
| B | 5 | 1 | 0.5 | 0.05 | 15 |
| C | 5 | 1 | 0.5 | 0 | 15/30 |

Results and Discussion

The results corresponding to the three analyzed polymerization protocols (see Table 1) are discussed below. In each case, the colloidal stability of the synthesis product was assessed in synthetic formation water similar to that of the Grimbeek (GBK) field, located in the Chubut province, Argentina, with a salinity of about 20000 ppm.

i) Protocol A

The first analyzed synthesis was performed on the basis of previously disclosed protocols for similar polymerizations carried out on surfaces and not on particles. A combination of Cu (I) and Cu (II) was used as a catalytic system. Since the catalytic activity is given by the oxidation of a complex formed by Cu (I) and bipyridine, Cu (II), present since the reaction start, moderates said activity and leads to a controlled polymerization, according to the bibliography teachings.

Colloidal stability was assessed in these conditions for the solid product. When contacting the solid with formation water (similar to GBK), it remains on the surface forming drops, without dispersion. The product is completely immiscible with the solution.

Given the observed hydrophobicity, the product stability was assessed in an organic solvent with less polarity. Toluene was used. As a result, a total re-dispersion of the solid was achieved. This shows that the obtained product has oleophilic characteristics. The observed orange color corresponds to the presence of FITC fluorophore of the NT.

ii) Protocol B

In order to revert the hydrophobic characteristics observed in the product of protocol A, the synthesis was modified by reducing the employed amount of Cu (II) (see Table 1). In this way, it was sought to favor the polymer growth. The obtained product in these conditions could be dispersed in GBK water. A stable orange colloidal suspension was obtained.

From SEM images of the product, by means of ImageJ software the average diameter of the NT was estimated as being equal to 150±40 nm. The average diameter of the tracers prior to the surface modification is 80±20 nm. Therefore, this result proves the polymer growth on the surface. Polymerization generates a significant increase of 80% in the total diameter of NT. Besides, an increase in NT polydispersity is also observed.

Figure 5:
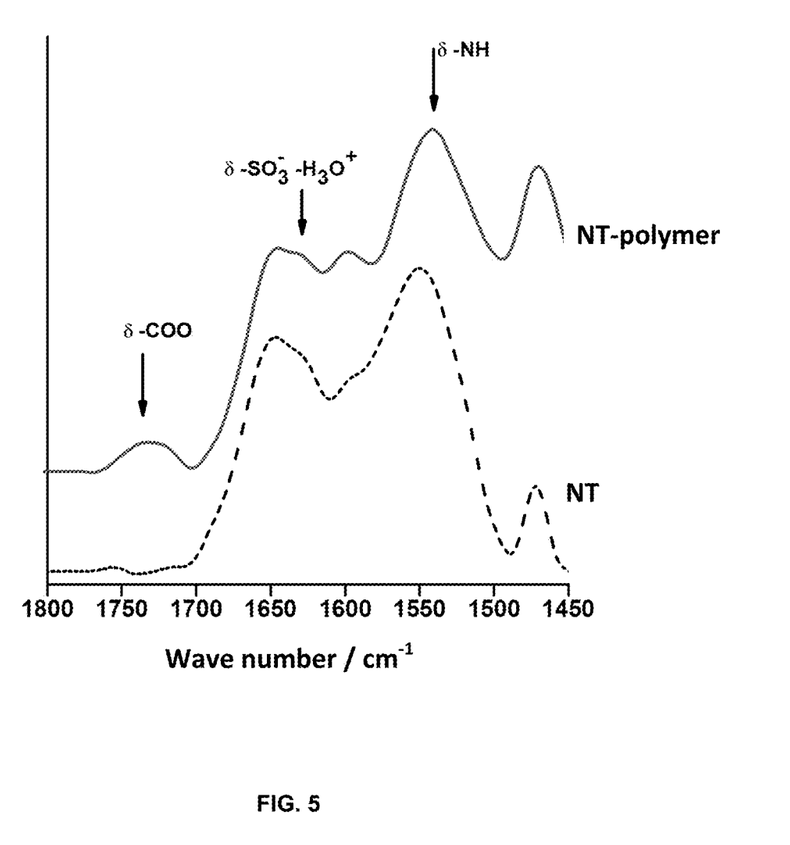
FIG. 5 shows DRIFTS spectra from samples of an exemplary embodiment of the present invention. Solid lines correspond to a NT-polymer and dotted lines correspond to a NT not polymerized or NT-initiator.

In order to qualitatively assess the presence of the polymer on the NT surface, the characterization of the obtained product was performed by means of DRIFTS technique. The spectrum corresponding to the tracers prior to polymerization was used as a blank for this analysis. FIG. 5 shows both spectra.

In the spectra obtained by DRIFTS for samples NT and NT-polymer of FIG. 5, it may be observed the appearance of two bands after polymerization. A new signal in the zone at 1730 $cm^{-1}$ is allocated to C=O stretching of ester group, and that corresponding to 1630 $cm^{-1}$ to O—H stretching in —$SO_3^-$—$H_3O^+$, both functional groups being present in the chemical structure of the monomer (MEDSAH). Therefore, the presence of the polymer is corroborated, according to what is observed by SEM.

Figure 6:
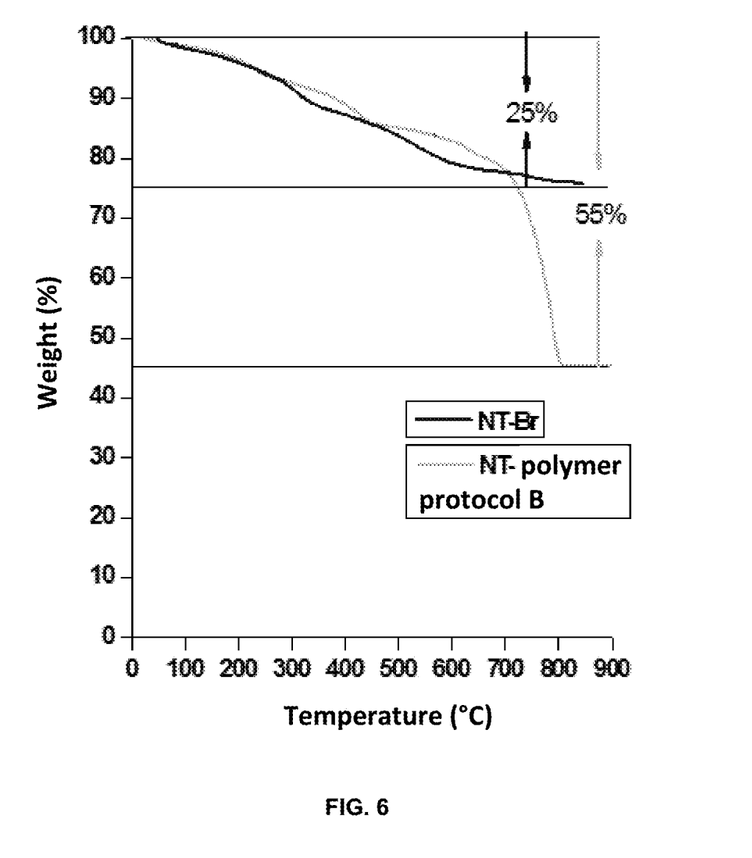
FIG. 6 shows the results of an analysis by TGA of samples from exemplary embodiments of the invention, representing NT-initiator (dark grey) and NT-polymer (light grey) species.

In order to estimate the mass of the polymer grown on the NT surface, a thermo-gravimetric analysis (TGA) of the NT functionalized only with the initiator (NT-Br) and with the polymer (NT-polymer) was performed, as shown in FIG. 6. Taking the sample of NT-Br as a reference, a 30% increase in the mass loss in the NT-polymer sample was observed, corresponding said mass excess to the grown polymer.

Considering the results obtained from the studies performed in solution, it can be concluded by means of microscopy and TGA that the NT were polymerized in a considerable extent.

iii) Protocol C

In Protocol B, by reducing the percentage of added Cu (II), an improvement in the product stability in highly saline medium was achieved. In order to reduce the thickness of the polymeric layer and thereby reducing the increase of NT size, Protocol C was performed. In this protocol Cu (II) was completely removed from the synthesis (as shown in Table 1).

The colloidal stability was also assessed on the obtained solid. This product could be re-dispersed in formation water (GBK).

Characterization by means of DRIFTS, TGA and SEM allow assessing the impact of protocol change in the polymer growth.

Conclusions

By means of the ATRP method, zwitterionic polymers based on MEDSAH monomer were synthesized, the polymers covalently anchored through the surface amino groups of the tracer cores. FIG. 4 shows a diagram of the method to obtain the tracers of the present invention using Protocol B.

By way of small modifications in the synthesis protocol, it was possible to obtain three different products. Two of the obtained products were colloidally stable in solutions of high salinity similar to formation water of GBK, keeping their own orange color from the presence of FITC fluorophore.

The product corresponding to Protocol A could not be dispersed in the aqueous solution. It showed a clear affinity for the oil phase, since it got easily stabilized in toluene.

Therefore, according to the medium where the tracer is sought to be stabilized, the corresponding synthesis conditions could be selected. Protocols B or C, for tracers stable to high salinity. Protocol A, for tracers in oil phases.

b) Characterization of Nanotracers in Porous Medium

Figure 7:
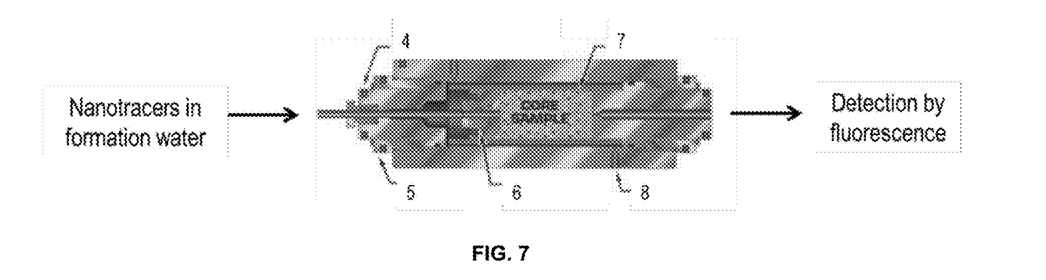
FIG. 7 shows a diagram of an experimental device used for the characterization of the nanotracers of the present invention in a porous medium.

The performance assessment of nanotracers in rock, using a "BentheimerSandstone" rock model, shows that the particles of the nanotracers of the present invention pass through the rock without significant retention in high salinity conditions. FIG. 7 shows the experimental device used in the characterization. The device comprises an end cap (4), an end plug (5) as well as a floating distribution plug (6). The core sample is placed inside a sleeve (7), subjected to a common radial and axial pressure by means of orifices (8) for introducing a pressure exerting fluid.

To evaluate the NT retention in the experimental device, the relative fluorescence intensity is measured at the outlet and represented as a function of the injected volume.

The behavior of the nanotracers of the present invention is similar to that disclosed in the technical literature for more complex particles, with a more expensive synthesis and involving a detection step in laboratory instead of in the field.

Figure 8:
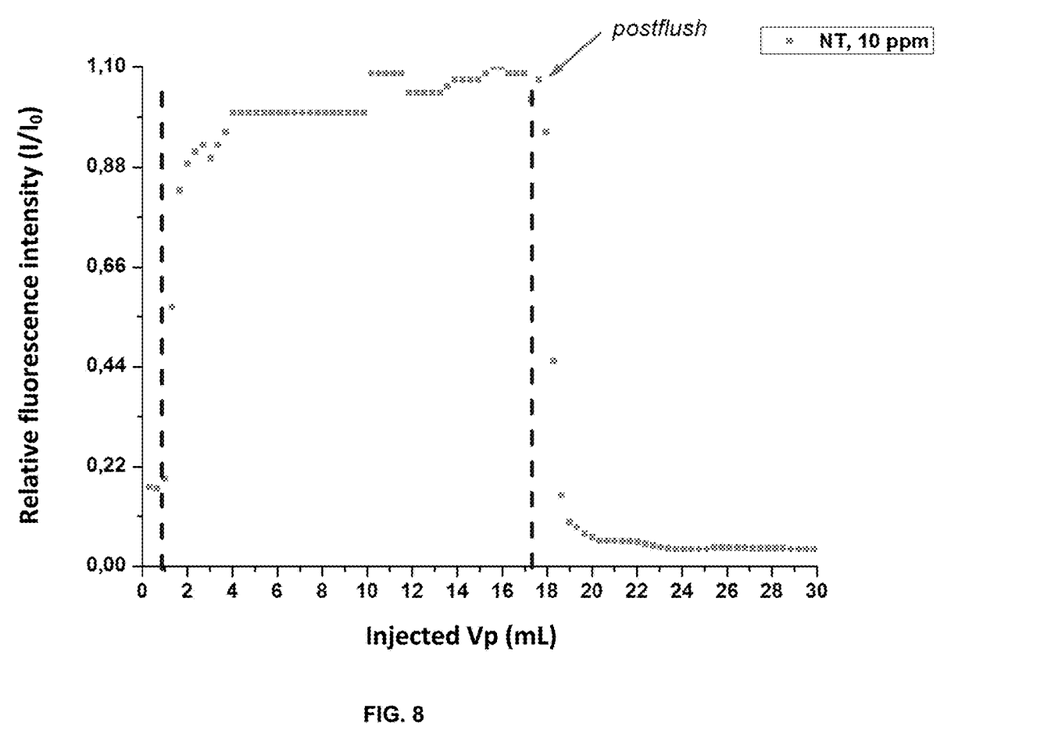
FIG. 8 shows the results obtained for NT recovery using the experimental device of FIG. 7.

FIG. 8 shows the recovery curve of the NT as they pass through porous medium. A dispersion of 10 ppm of NT was injected and the sweeping was finished with a synthetic 9000 ppm salinity water postflush, keeping a constant flow rate. It can be observed that obtained curve is similar to that of an ideal tracer, i.e. without retention. Using calculations based on mass balance calculations, a recovery of about 100% was estimated.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The invention claimed is:

1. Nanotracer for oil recovery comprising
a core containing a fluorescent cell, and
a shell surrounding the core,
wherein the outer surface of the shell comprises a zwitterionic polymer.

2. Nanotracer according to claim 1, wherein the fluorescent cell comprises silica and a fluorophore.

3. Nanotracer according to claim 1, wherein the shell comprises a polymer of silica with amino groups.

4. Nanotracer according to claim 1, wherein the zwitterionic polymer comprises a polymer of [2-(methacryloyloxy)ethyl] dimethyl (3-sulfopropyl) ammonium hydroxide.

5. Nanotracer according to claim 1 in the shape of a substantially spherical particle having a diameter of about 80 nm, wherein the core has an average size of about 180 nm.

6. Method of preparation of a nanotracer for oil recovery according to claim 1, the method comprising the steps of:

providing a particle comprising a core containing a fluorescent cell and a shell surrounding the core,
reacting the shell surface with a polymerization initiator so as to obtain a particle with anchoring sites, and
reacting the particle with anchoring sites with a monomer in anhydrous conditions and in the presence of a catalyst and a ligand so as to produce the monomer polymerization.

7. Method according to claim 6, wherein the shell has a molecular structure comprising amino groups.

8. Method according to claim 6, wherein the polymerization initiator is bromoisobutyrate.

9. Method according to claim 6, wherein the monomer is [2-(methacryloyloxy)ethyl] dimethyl (3-sulfopropyl) ammonium hydroxide.

10. Method according to claim 6, wherein the catalyst comprises copper and the ligand is bipyridine.

* * * * *

UNITED STATES PATENT AND TRADEMARK OFFICE
CERTIFICATE OF CORRECTION

PATENT NO.       : 10,995,610 B2  
APPLICATION NO.  : 16/396306  
DATED            : May 4, 2021  
INVENTOR(S)      : Alejandra Calvo et al.

Page 1 of 1

It is certified that error appears in the above-identified patent and that said Letters Patent is hereby corrected as shown below:

On the Title Page

Item (73), should read:  
YPF TECNOLOGIA S.A., Cuidad Autónoma de Buenos Aires, (AR)  
CONSEJO NACIONAL DE INVESTIGACIONES CIENTIFICAS Y TÉCNICAS (CONICET),  
Ciudad Autónoma de Buenos Aires, (AR)

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*